Jan. 17, 1933.  R. D. JUNGE  1,894,591
EGG PACKING DEVICE
Filed Aug. 5, 1931   2 Sheets-Sheet 1
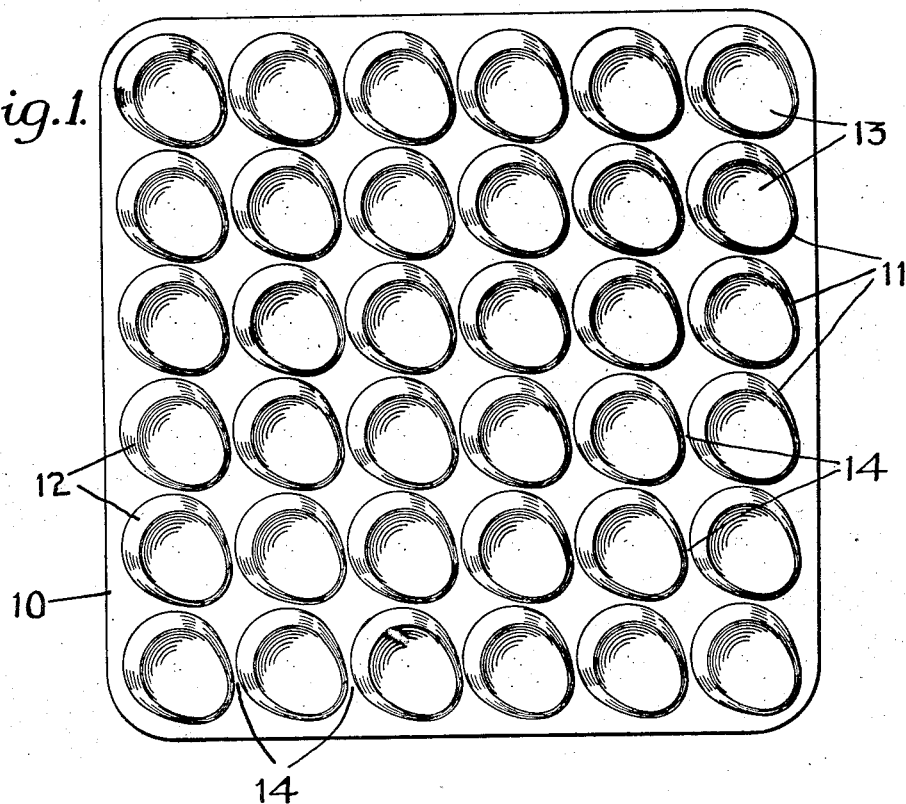
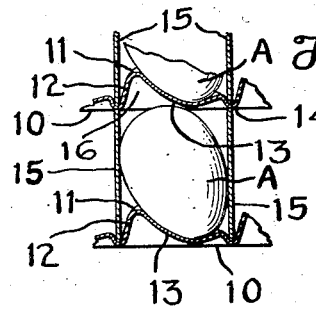
Inventor
Reuben D. Junge
By His Attorney Jan. 17, 1933.  R. D. JUNGE  1,894,591
EGG PACKING DEVICE
Filed Aug. 5, 1931   2 Sheets-Sheet 2
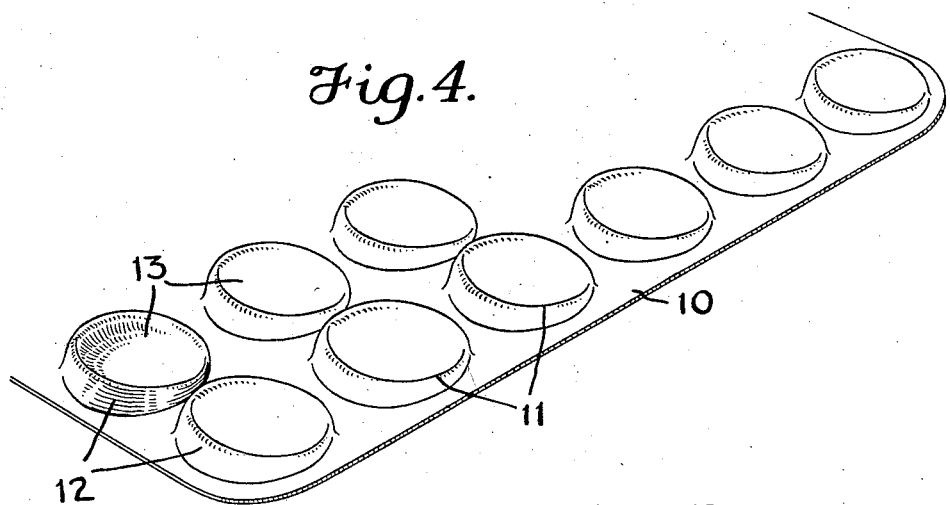
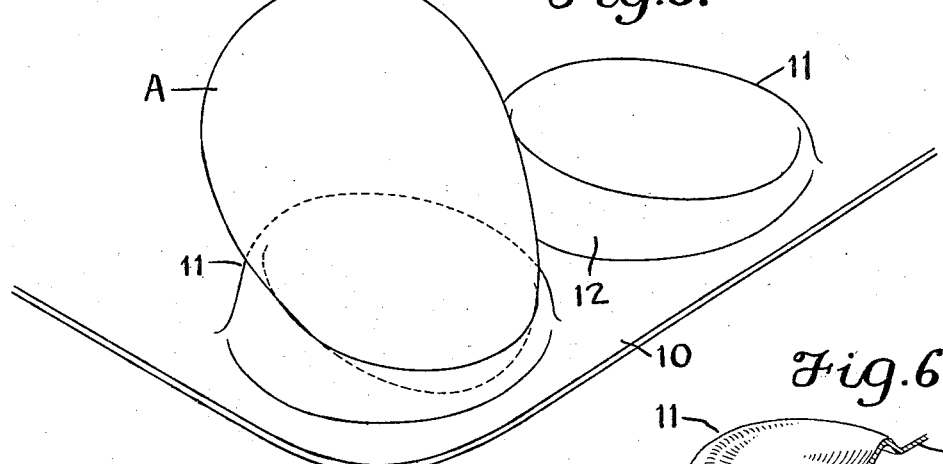
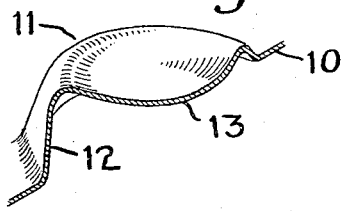
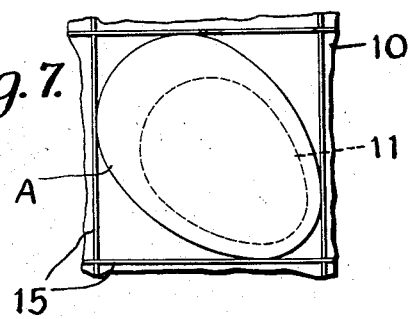
Inventor
Reuben D. Junge
By His Attorney Patented Jan. 17, 1933

1,894,591

UNITED STATES PATENT OFFICE

REUBEN D. JUNGE, OF NEW YORK, N. Y., ASSIGNOR, BY DIRECT AND MESNE ASSIGNMENTS, TO KEYES FIBRE COMPANY, INC., OF WATERVILLE, MAINE, A CORPORATION OF MAINE

EGG PACKING DEVICE

Application filed August 5, 1931. Serial No. 555,154.

The invention relates to egg packing devices.

It is a well known fact that in shipping or transporting eggs from place to place there are substantial losses due to breakage. The principal object of the present invention is to provide a means for packing eggs so that such losses may be greatly reduced or in fact practically eliminated.

Another important object is to provide a packing means whereby the space in the container in which the eggs are packed may be utilized to a much better advantage. With present methods of packing, extra large eggs or small undersized eggs present a particular problem. The containers are naturally designed so the average size egg will rest upright in its particular compartment. If the eggs are extra large their ends are often crushed and if they are undersized they rattle about in their compartments, a great amount of breakage being the result in either case. In accordance with the present invention the egg is so positioned in its individual compartment that regardless of its size a maximum amount of support is afforded for its fragile walls and all sized eggs will readily be accommodated in the holders provided therefor.

It is customary in packing eggs to provide layers of compartments one above the other. In the completed package or crate the eggs therefore rest end to end, and the upper layers are supported on the lower layers. The eggs resting end to end in this manner a substantial amount of breakage must result from rough handling which they are bound to receive in shipping. The present invention contemplates sloping the eggs in their separate compartments so that they will not rest end to end, or in other words arranging the eggs so the upper layers will not be directly above the high points of the eggs in the lower layers. In addition to greatly reducing the breakage this arrangement effects great economies in the actual packing of the eggs. When the packers are placing the eggs in their separate compartments the eggs must be handled gently or the ends coming against each other will be cracked. In the present invention, the holders in the compartments being so arranged that the ends of the eggs cannot abut each other, the packers may work with considerable more speed and yet have less breakage.

Another important advantage of the present invention resides in the fact that the eggs are so supported in their compartments that there is no side contact between eggs in adjoining cells, thus the contact points are offset not only between succeeding layers in a crate, but also as between adjoining eggs in any given layer.

Still another important advantage resides in the formation of the holders for the individual eggs, the holders being so arranged as to provide substantially greater supporting strength and permit of vertical crushing thrusts being distributed laterally.

Still another object is the provision of flats which may be more efficiently nested or stacked together for shipping purposes.

In addition to the foregoing other objects and advantages will become apparent as this specification proceeds. Referring to the drawings forming a part thereof and in which a preferred embodiment of the invention is illustrated:

Fig. 1 is a plan view of one of the horizontal sheets or "flats" used in carrying out the invention;

Fig. 2 is an edge view thereof, partly in section;

Fig. 3 is a vertical sectional view showing one of the compartments and parts of adjacent compartments;

Fig. 4 is a perspective view of an end of one of horizontal sheets or "flats";

Fig. 5 is a fragmentary detail perspective view on a larger scale, showing two of the holders, an egg being indicated in one of them;

Fig. 6 is a fragmentary detail perspective sectional view of one of the holders; and Fig. 7 is a fragmentary detail plan view.

Referring again to the drawings, the reference numeral 10 designates one of the sheets or "flats" used in carrying out the invention. This sheet may be made of paper, pulp, wood, rubber or any other suitable material.

As illustrated a plurality of holders 11 are formed in said sheet, the holders being equidistantly spaced from each other. Each holder is substantially oval-shaped in plan view and projects upwardly from the sheet 10. The long axis of the oval-shaped holders is disposed in angular relation to the sheet or "flat". It is particularly important that the height of the holder at one end of its long axis be greater than the height at the opposite end thereof.

Each holder comprises an upwardly extending wall 12 which merges into the concave pocket portion 13 which readily adapts itself to eggs of different sizes. The peripheral edges of the upstanding walls 12 at their junctures with the sheet proper are fairly close to each other at points approximately 90° apart and in this manner form an ideal positioning means, as indicated at 14, for the customary filler strips 15.

The filler strips 15 are laid at right angles to each other in the usual manner between the sheets or "flats" and form the individual compartments for the eggs A as illustrated in Figs. 3 and 7.

Particular attention is now directed to Figs. 3 and 7. Due to the angular disposition of the holders 11 they will occupy a position approximately diagonal of the individual compartments as shown in Fig. 7. Also due to their particular shape, as heretofore described, the egg A will assume a position in which its major axis rests at an angle of substantially less than 90° in relation to the plane of the sheet. This arrangement which is particularly illustrated in Fig. 3 provides for a much better utilization of the space within the compartment than the customary arrangement of supporting the egg in an upright position. It also has the very important advantage of causing the high points of the eggs in the lower compartments not to be directly under the eggs in the compartments above thus eliminating breakage both in shipping and in packing.

The oval-shaped holders being high on one of their ends does not cause the holder to take up any excess room in the compartment but it does have the advantage of providing a large contact surface or supporting surface for the egg and causes the egg to rest in a sloping position in its compartment. It also results in a greatly added protection to the eggs as it provides for additional spring and cushion effect. It has the further beneficial result of providing adequate or additional space as indicated at 16 in Fig. 3 into which the upper part of the egg may project slightly.

The high-low structure of the holders gives them greater supporting strength than if made the same height all around as the high part considerably strengthens the holder as a whole. By virtue of this construction a diagonal bracing effect is secured and all vertical crushing thrusts are more effectively distributed laterally.

It is also desired to draw attention to another important feature. The inclining of the holders and their disposition with their major axes diagonal of the filler cells practically insures that the egg will be supported at two laterally spaced points, that is, by the two cell walls which form the corner adjacent the high part of the holder. Also, these points of support in one cell are not directly opposite those of the next cells of the same layer. This has the important result of permitting no side contact between eggs in adjoining cells. In other words, the contact points are offset not only between succeeding layers in a crate as heretofore explained, but also as between adjoining eggs in any given layer, thus forming an ideal condition to eliminate breakage in shipping or packing the eggs.

The sheets can be manufactured in units having various numbers of holders thereon and may be utilized in containers or carriers having one or more layers of eggs therein.

For shipping purposes it is desirable to stack or nest the flats. The high portions of the holders enable this operation to be performed with greater facility. In nesting the flats the high parts will engage first and serve to "center" one flat on another before they are completely telescoped together. In this manner one flat may be more quickly located in matching position on top of another.

Since changes in details of construction will suggest themselves to those skilled in the art it will be understood that the foregoing description is illustrative and is not intended to limit the scope of the invention pointed out in the appended claims.

I claim:

1. A packing for eggs, comprising a sheet having a plurality of equidistantly spaced holders formed therein, and means for forming separate rectangular compartments about each of said holders, each of said holders being substantially oval-shaped in plan view and disposed diagonally in its compartment, the holder being so formed to firmly support an egg in said compartments, the major axis of the egg being at substantially less than 90° in relation to the plane of said sheet.

2. A packing for eggs, comprising a sheet having a plurality of equidistantly spaced holders formed therein, and means for forming separate rectangular compartments about each of said holders, each of said holders being substantially oval-shaped in plan view and disposed diagonally in its compartment, the height of the holder at one end of its long axis being considerably greater than the height at the opposite end of said long axis so as to firmly support an egg in said compartments, the major axis of the egg being at substantially less than 90° in relation to the plane of said sheet.

3. A packing for eggs, comprising a sheet having a plurality of equidistantly spaced holders projecting upwardly therefrom, each of said holders being inclined in relation to the sheet and provided with pockets having a relatively large surface contact with the eggs.

4. A packing for eggs, comprising a sheet having a plurality of equidistantly spaced holders thereon, each of said holders comprising a hollow elliptical cone truncated by a cutting plane non-parallel with the base.

5. A packing for eggs, comprising a sheet having a plurality of equidistantly spaced holders thereon, each of said holders comprising a hollow elliptical cone truncated by a cutting plane non-parallel with the base of said cone, said cutting plane in prolongation intersecting the base plane along a straight line in the latter perpendicular to the major axis of the base plane of said cone.

6. A packing for eggs, comprising a sheet having a plurality of equidistantly spaced holders thereon, each of said holders comprising a hollow elliptical cone truncated by a cutting plane non-parallel with the base of said cone, said holders having high and low peripheral points in the vertical plane of the major axis of the holders.

In testimony whereof I affix my signature.

REUBEN D. JUNGE.